United States Patent
Kobayashi

[11] Patent Number: 6,146,278
[45] Date of Patent: Nov. 14, 2000

[54] SHOOTING VIDEO GAME MACHINE

[75] Inventor: Tatsuya Kobayashi, Kobe, Japan

[73] Assignee: Konami Co., Ltd., Hyogo-ken, Japan

[21] Appl. No.: 09/000,542

[22] Filed: Dec. 30, 1997

[30] Foreign Application Priority Data

Jan. 10, 1997 [JP] Japan ................................. 9-003304

[51] Int. Cl.⁷ ............................. A63B 67/00; A63F 9/02
[52] U.S. Cl. ............................ 463/53; 463/7; 463/36; 463/37; 463/39; 463/51; 463/52; 463/54; 345/27; 345/28; 345/156; 345/158; 345/180; 345/192; 345/193; 345/207
[58] Field of Search .......................... 463/7, 37, 36, 463/39, 53, 52, 54, 49, 50, 51; 273/331, 333, 348, 358, 359; 345/180, 156, 158, 192, 193, 516, 517, 207, 27, 28

[56] References Cited

U.S. PATENT DOCUMENTS

| | | |
|---|---|---|
| 4,813,682 | 3/1989 | Okada . |
| 4,955,812 | 9/1990 | Hill ....................................... 434/16 X |
| 5,310,192 | 5/1994 | Miyake ............................... 173/310 X |
| 5,351,969 | 10/1994 | Smith, III et al. ................... 273/438 X |
| 5,366,229 | 11/1994 | Suzuki . |
| 5,401,025 | 3/1995 | Smith, III et al. .............. 273/148 B X |
| 5,734,807 | 3/1998 | Sumi ................................... 395/127 X |

FOREIGN PATENT DOCUMENTS

0728503  8/1996  European Pat. Off. .

*Primary Examiner*—Jessica J. Harrison
*Assistant Examiner*—Binh-An Nguyen
*Attorney, Agent, or Firm*—Jordan and Hamburg LLP

[57] ABSTRACT

A shooting video game machine includes a monitor screen, a light source near the monitor screen, and a mock gun having an image sensor with a pixel array for capturing an image including the monitor screen and the light source. A light source position detection unit detects as image position of an image of the light source in the pixel array. A hit position detection unit for determines a position aimed at on the monitor screen based on the image position. The light source position detection unit includes a detector for detecting pixels having data of the image of the light source and stores only address of the detect pixels to a memory. A light source position calculator calculate the image position of the light source according to the address data stored in the memory in a certain time period.

12 Claims, 8 Drawing Sheets

FIG. 9

SHOOTING VIDEO GAME MACHINE

BACKGROUND OF THE INVENTION AND RELATED ART STATEMENT

This invention relates to a shooting video game machine having a monitor screen which displays target characters and a mock gun which aims at and shoots the character(s) displayed on the monitor screen.

Conventionally, the shooting video game machine of this type includes a mock gun having a muzzle, a trigger, and a light receiving element arranged on the muzzle and a monitor screen such as a projector having a CRT for projecting game.

Such shooting video game machine is constructed such that when the trigger is pulled, a so-called white screen made only by emission lines by a raster scanning for one frame and the light receiving element receives a light produced during the raster scanning and then a hit position (or a point of impact) by the mock gun is detected by a time elapsed from the beginning of the raster scanning to the time when the light is received by the light receiving element of the mock gun. Thereafter, the judgment is made if the obtained hit position is within the target character displayed on the monitor screen and if the judgment result is affirmative, then it is determined as "hit". It should be noted that hereinafter the word "hit", used throughout this application, is not meant to be an actual hit in physical sense, but is meant to be a virtual hit on the character on the monitor screen by the virtual bullet fired by the mock gun.

With the shooting video game machine above, when the semi-automatic type gun, which sequentially fires bullets during the time the trigger is pulled, is used as a mock gun, the white screen has to come out at each firing timing to detect the hit position. Thus, the number of appearances of white screen in a short period of time is increased, resulting in a reduction of the number game images displayed which; are basically essential images of the monitor screen. As a result, the quality of the screen image is degraded.

As a solution to the above problem, a shooting video game machine is proposed having an infrared light emitter arranged in the predetermined position near the monitor screen for emitting an infrared light and an area sensor, provided on the mock gun, consisting of an image pick-up device made of such as a CCD (Charge Coupled Device) for picking up image of the spot light emitted from the infrared light emitter. Then with this image pick-up device, the light receiving position is detected and then the hit position is obtained. Subsequently, a judgment is made if the hit position is in the target character(s) on the monitor screen or not.

With the thus described shooting video game machine, a switch over of the screen between the white screen and game image screen is not required. Thus it is possible to prevent the degradation of the quality of screen image.

However, even with the later described shooting video game machine, a position detection unit, which detects a hit position of the bullet, has image data, of the infrared spot light captured by the image pick-up device provided on the mock gun, temporarily stored in a frame memory. Thus, the use of the frame memory necessitates a read-in address generating unit for generating read-in frame addresses and a read-out address generating unit for generating read-out addresses corresponding to the certain area within the frame memory. Therefore, structure of the position detection unit is complicated and cost of the shooting video game machine as a whole rises. Accordingly, there exists room for improvement in terms of the structure of the position detection unit.

SUMMARY OF THE INVENTION

It is therefore an object of this invention to solve the problems of the conventional machines described in the foregoing section.

It is another object of this invention to provide a shooting video game machine having a position detection unit with a simpler structure thereby lowering a cost of the shooting video game machine as a whole.

To fulfill the above objects according to this invention, a shooting video game machine comprises a monitor screen for displaying character; a light source arranged at a certain position relative to the monitor screen; a mock gun for aiming at the character on the monitor screen, the mock gun having an area sensor for capturing an image of a certain area including the light source therein in a unit of pixel; a light source position detection unit for repeatedly detecting an image capturing position of the light sensor within the image capturing area of the area sensor at a certain frame cycle; and a hit position detection unit for detecting a hit position by the mock gun in the monitor screen based on the image capturing position of the light source in the image capturing area; the light source position detection unit including a light source address detector for detecting an address of a pixel data corresponding to the light source from a series of pixel data sequentially read out by the area sensor in synchronism with the certain frame cycle; a memory temporarily storing the address data detected by the light source address detector; and a light source position calculator for calculating the image capturing position of the light source with the use of the address data stored in the memory in a time period from a completion of the certain frame cycle to an end of the certain frame cycle.

With the thus constructed shooting video game machine, a character displayed on the screen monitor is aimed by the mock gun and virtually shot and at the same time the image of the light source arranged at the certain position with respect to the monitor screen is positioned in the image capturing area of the area sensor. The image position of the light source within the image capturing area is periodically detected by the light source position detection unit at the certain frame cycle. Then with this detected image position of the light source, the hit position (or hereinafter also referred to as a POI: point of impact; a virtual hit position by the bullet virtually fired through the muzzle of the mock gun) in the monitor screen is calculated by the hit position detection unit. Where the light source position detection unit in synchronism with the certain frame period extracts (readout) the addresses of pixel data corresponding to the light source among the row of pixel data obtained through the horizontal scanning operation and temporarily stores the read-out address data in the memory. Subsequently, with the address data stored in the memory, the image position of the light source is calculated within a time period from the completion of the certain frame time period to the next frame time period.

Accordingly the whole data obtained at each completion of the horizontal scanning operation as in the case with the conventional video game machine are not stored in the frame memory. Instead only the portion of the data corresponding to the light source among the pixel data row obtained during the horizontal scanning operation are stored temporarily in the memory, thus it reduces the required memory capacity and in turn simplifies the structure of the light source position detection unit. As a result, it contributes to lowering the production cost of the shooting video game machine as a whole.

These and other objects, features and advantages of the present invention will become apparent upon reading the following detailed descriptions along with accompanying drawings.

DETAILED DESCRIPTION OF THE PREFERRED EMBODIMENT OF THE INVENTION

Figure 1:
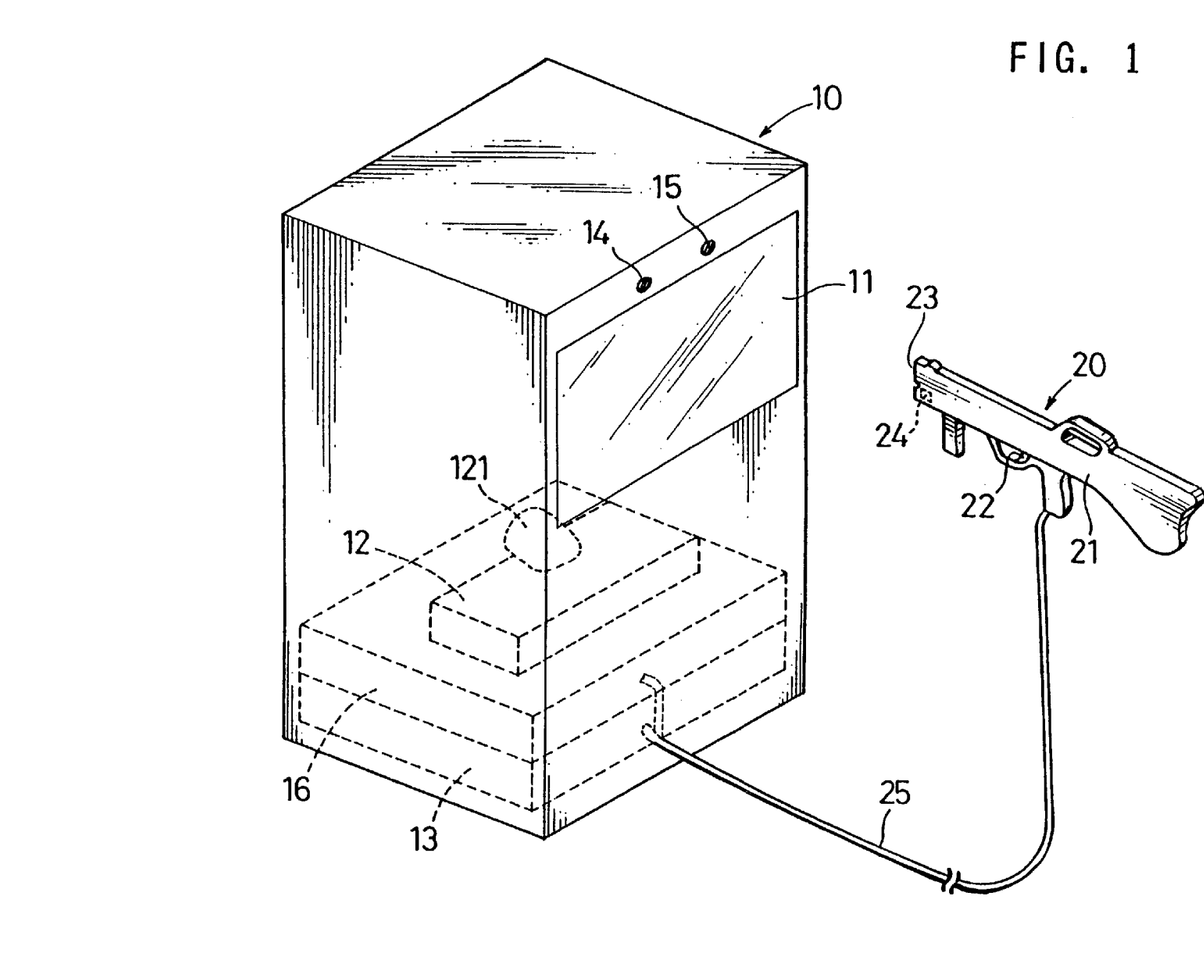
FIG. 1 is a simplified perspective view showing an appearance of a shooting video game machine of an embodiment of the present invention.

FIG. 1 is a perspective view showing a structure of a shooting video game machine of an embodiment of the present invention. In FIG. 1, the shooting video game machine includes of a game machine main unit 10 and a mock gun 20.

The game machine main unit 10 has a monitor screen 11, a projector 12 for projecting game image on the monitor screen 11, and a game controller 13 for processing a game in accordance with programs stored in a ROM and shooting results of the mock gun 20, and transmitting image signals to the projector 12. In addition, the game machine main unit 10 has a pair of light sources 14, 15 arranged at certain positions slightly above an upper boundary of the monitor screen 11 and a position detection unit 16 arranged proximate to the game controller 13. The light sources 14, 15 each produce infrared spot light having a wave length which is out of human-viewable-range. The position detection unit 16 detects a hit position of the mock gun 20. It should be noted that hereinafter the word "hit" used throughout this application is not meant to be an actual hit in the physical sense, but is meant to be a virtual hit on the character on the monitor screen by a virtual bullet fired by the mock gun.

In the thus constructed game machine main body 10, a projecting portion 121 of a projector 12 projects game images on an un-illustrated mirror provided at rear of the game machine main unit 10 and then the reflected image from the mirror is projected onto the monitor screen 11 provided in a front-top portion of the game machine main body 10. The light sources 14, 15 are set to emit light upon actuation of an-LED drive circuit. It should be noted that the light sources 14, 15 may be placed in the monitor screen 11 so as not to interfere with the game image on the monitor screen 11.

The mock gun 20 has a main body 21 and a muzzle 23. The mock gun 20 is provided with a trigger 22 below the main body 21 and an area sensor 24 made of a CCD (charge coupled device) with an effective sensitivity in a range of infrared light and the mock gun 20 is connected to a game controller 13 and the position detection unit 16 of the game machine main body 10 via a cable 25. The mock gun 20 is set such that when the trigger 22 is pulled, then a trigger signal is transmitted to the game controller 13 through the cable 25 and when the trigger 22 is maintained in its pull-state, the trigger signals are sequentially (intermittently) generated at a certain frequency (for instance 10 times per second) in the game controller 13 and during this time period the mock gun 20 is seen as sequentially firing bullets. It should be noted that the mock gun 20 does not fire a real bullet in the physical sense, but the game machine of this invention is set such that the player feels as if bullets were fired through the muzzle 23 of the mock gun 20 when the trigger 22 is pulled.

In addition, though un-illustrated in FIG. 1, in front of the area sensor 24, there is provided a filter which permits a passage of the light with a certain wave length range to distinguish the certain light from the other interfering lights coming from other directions and a lens which forms an image on a light receiving surface of the area sensor 24. The light receiving surface of the area sensor 24 is oriented obliquely upward in order to capture the infrared spot light emitted from the light sources 14, 15 that are provided above the upper boundary of the monitor screen 11 even when the muzzle 23 is directed to the lower part of the monitor screen 11. Also, the area sensor 24 has a synchronizing signal generator.

With the thus constructed mock gun 20, the infrared spot lights of the light sources 14, 15 are continuously received in the area sensor 24 and the pixel data corresponding to the captured images of infrared spot lights are transmitted to the position detection unit 16 through the cable 25. The position detection unit 16 calculates a point of impact (hereinafter referred to as "POI") where the virtual bullet (non-existing bullet only assumed to be fired through the muzzle 23 in a direction the mock gun 20 is aimed at) fired through the muzzle 23 of the mock gun 20 intersects with the monitor screen 11 based on the aforementioned pixel data. The method of obtaining the POI position is fully described However, it should be noted here that the calculation of POI position is performed based on the positions of the picked up images of the infrared spot lights by the area sensor 24 and is performed in synchronism with the synchronized signal issued by the area sensor 24 regardless of the firing state of the mock gun 20 during the game.

Figure 2:
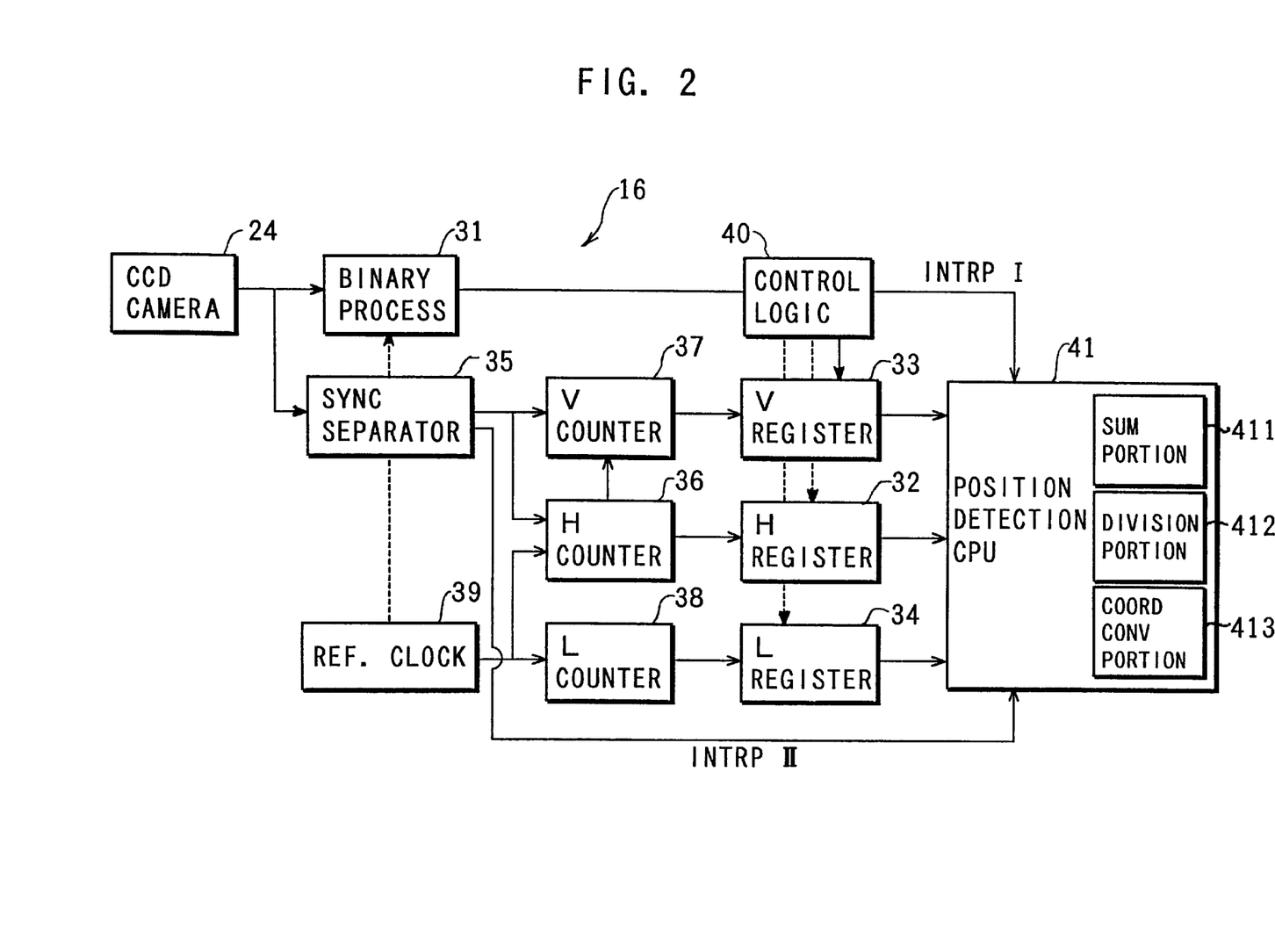
FIG. 2 is a block diagram showing a structure of a position detection unit of the shooting video game machine of FIG. 1.

FIG. 2 is a block diagram showing the structure of the position detection unit 16 of the aforementioned shooting video game machine.

As shown in FIG. 2, the position detection unit 16 includes a binary processing portion 31 for converting the image of the infrared spot light consisting of a plurality of pixels into a set of binary data, i.e., high/low depending upon comparison result of each pixel data with a threshold value (predetermined) at a reference clock timing; an H-register 32 which latches an x-coordinate data for the first pixel (hereinafter referred to as a first point pixel) among the high level data outputted from the binary processing portion 31 along a horizontal scanning direction; and a V-register 33 which latches a Y-coordinate data for the first point pixel, and an L-register 34 which latches a line length (i.e., the number of pixels corresponding to the high level data in the horizontal scanning direction) along each horizontal scanning line from the first point pixel to the last pixel (hereinafter also referred to as a last point pixel). The position detection unit 16 further includes a synchronized separator 35 which separates the signals from the area sensor 24 into a horizontal synchronism signal and a vertical synchronism signal; an H-counter 36 which assigns an x-coordinate value to each first point pixel of the high level signal in accordance with the horizontally synchronized signals outputted from the synchronized separator 35; a V-counter 37 which assigns a y-coordinate value to each first point pixel of the high level signal in accordance with the vertically synchronized signals outputted from the synchronized separator 35, an L-counter 38 which counts the line length of the high level data outputted from the binary processing portion 31; and a reference clock 39 for providing a count timing signal to the H-counter 36 and the L-counter 38.

The position detection unit 16 yet further includes a controller logic 40 for reading out the pixel data from the area sensor 24 and for controlling operations of the H-register 32, the V-register 33 and the L-register 34 and a CPU 41 for obtaining the positions of the picked up image of the infrared spot lights within the image area of the area sensor 24 using the coordinate values latched in the H, V, and L registers 32, 33, 34 and for detecting the hit position (POI position) on the monitor screen 11.

Specifically, the position detection CPU 41 includes a summation portion 411 which sums up all the addresses of the pixel data based on the x and y coordinates and the line length (unit in pixel) latched in the H-register 32, the V-register 33, and the L-register 34 respectively; a division portion 412 which divides the summed up data obtained at the summation portion 411 by the summed up value of each line length (i.e., a total number of pixels) and a coordinates conversion portion 413 which converts the coordinate of the image picked up by the area sensor 24. Note that division of the summed up value mentioned above by the sum of respective line length (the total number of pixel of higher level) will give an address of a gravity center as all the address data are summed up and are averaged. In addition, the position detection CPU 41 is provided with a ROM for storing processing programs and a RAM for temporarily storing the data.

It should be noted that the addresses of a second point pixel, a third point pixel, . . . , up to the last point pixel can be obtained once having known the address of the first point pixel; say (x1, y1), and the line length (n) as the address of the second point pixel, for instance, is merely (x1+1, y1) , the address of the third point pixel is (x1+2, y1), the address of the fourth point pixel is (x1+3, y1) . . . , and finally the address of the last point pixel is (x1+n−1, y1).

Figure 3A:
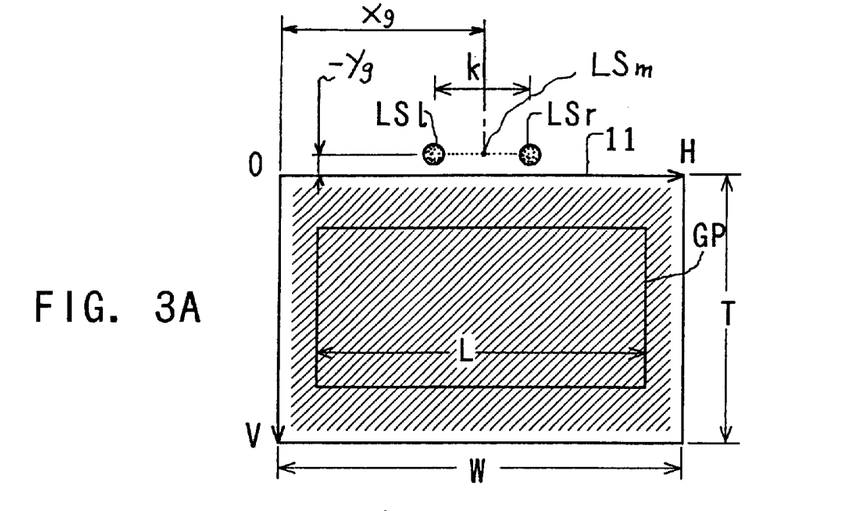
FIG. 3A is a diagram showing a view of a monitor screen through an area sensor when the monitor screen is completely within the viewable area of the area sensor.
Figure 3B:
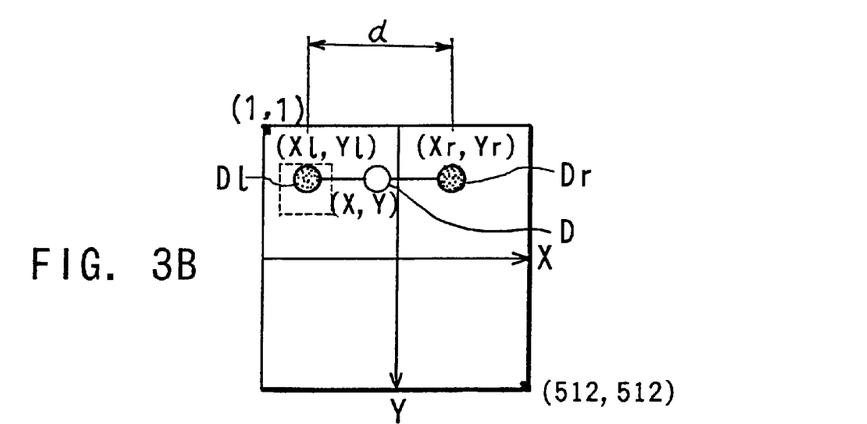
FIG. 3B is diagram showing an image captured by the area sensor when viewing the monitor screen 11 of FIG. 3A through the area sensor.
Figure 3C:
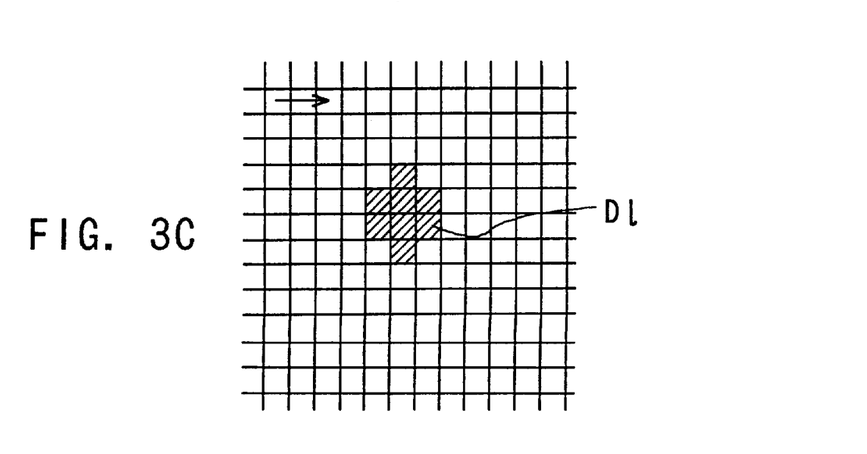
FIG. 3C is an enlarged diagram showing a portion of the whole image area captured by the area sensor.

FIG. 3 is a diagram illustrating operation of the aforementioned position detection unit 16 in detail. FIG. 3a is a diagram showing the monitor screen having a width W (horizontal direction) and a height T (vertical direction) within a viewable area of the area sensor 11, FIG. 3b is a diagram showing an image of the area sensor 24 when the image of the monitor screen 11 of FIG. 3a is picked up (or captured), and FIG. 3c is an enlarged view of the particular area of the picked up image by the area sensor 24. It should be noted that unless otherwise specifically stated in the description of the embodiment of this invention, an H-axis extend over a horizontally upper part of the monitor screen 11, a V-axis extends vertically on a left side of the monitor screen 11, and an origin of this H-V coordinate system is set at a top left corner of the H-V axes. Furthermore, it is set such that an x-axis extends horizontally in the imaging area of the area sensor 24 and a y-axis extends vertically in the imaging area of the area sensor 24.

More specifically, as shown in FIG. 3a, a game screen GP is projected on the monitor screen 11 and a pair of light sources 14, 15 are provided above the monitor screen 11 and are driven to emit infrared spot lights LSl, LSr. These infrared spot lights LSl, LSr are arranged with respect to a vertical center line of the monitor screen 11 the approximately the same distance from the vertical center line in a left and a right direction respectively. The distance k between the infrared spot lights LSl, LSr is preferably shorter than the width W of the monitor screen 11. In FIG. 3b, pixel data Dl an Dr, corresponding to the left and the right infrared spot lights LSl and LSr, are indicated. In FIG. 3c, a smallest square indicates a pixel within the imaging area of the area sensor 24 and only the pixel data Dl corresponding to the left side infrared light spot is illustrated. As shown in FIG. 3c, the pixel data of Dl consists of plural pixels in both x and y directions, enabling distinction over the noise data (and other disturbances).

Next the operation of the position detection unit 16 is described with reference to FIGS. 2 and 3c. First of all, when the pixel data are read-out by the area sensor 24, each of the pixel data is converted to a binary data by the binary data processing portion 31 and sequentially the coordinates are assigned to each first point pixel outputted from the binary data processing unit 31 by the H and V counters 36, 37 in synchronism with the data read out in accordance with the synchronized signal issued from the synchronized separator and then those assigned coordinates are latched by the H-register 32 and the V-register 33.

Moreover, the line length from each first point pixel to the last point pixel of high level data outputted from the binary data processing portion 31 is counted by the L-counter 38 and the counted value (line length) is latched by the L-register 34. The position detection CPU 41, under instruction given by the control logic 40, reads in coordinate data of each first point pixel and line length data (number of pixels) latched in the H-register 32, the V-register 33 and the L-register 34. Then a judgment is made if the read data is a data of the infrared spot light or not by examining the line length and if found affirmative then the data are stored in the RAM.

Next, when the data corresponding to the image screen in its entirety are read out from the area sensor 24, all the addresses obtained from the address of respective first point pixels and the respective line lengths are summed up at the summing up portion 411 and the summed up data is divided by the sum of each line length (the total number of pixels) at the division portion 412.

What is obtained from the aforementioned division is an address (X, Y) as illustrated of a medium point between the pixel data Dl, Dr in FIG. 3b and this address (in 512 by 512 pixel-coordinates) is assumed to be a position of gravity center and this data of gravity center is used to detect the POI position. After the address (X,Y) of the gravity center D is calculated, the address of pixel data Dl, Dr, positioned left and right of the gravity center D respectively is formed based on the each coordinate and the line length stored in the RAM.

In other words, what is found first is the gravity center D and the necessary pixel data Dl (Xl,Yl) regarding the left infrared spot light LSl and the pixel data Dr (Xr,Yr) regarding the right infrared spot light LSr are obtained thereafter as the whole pixel data stored are grouped in two, depending upon on which side of the gravity center D each data lies.

Let us take the example of pixel data Dl (Xl, Yl), the address data (Xl,Yl) is obtained as follows: first all the address data of pixels obtained based on the first point pixels lying on the left side of the gravity center D and the corresponding line lengths are the summed up at the summing portion 411 and then summed up value is divided by the sum of the corresponding line lengths (the total number of pixels corresponding to the high level data on the left side of the gravity center D) at the division portion 412.

To obtain the pixel data (Xr,Yr), similar procedures includes: first all the address data of pixels obtained based on the first point pixels lying on the right side of the gravity center D and the corresponding line lengths are summed up at the summing portion 411 and then summed up value is divided by the sum of the corresponding line lengths (total number of pixels corresponding to the high level data on the right side of the gravity center D) at the division portion 412.

It should be noted that the X and Y coordinates, Dl (Xl, Yl); Dr(Xr, Yr), and D(X,Y) are coordinates expressed according to the 512 by 512 pixel matrix. As indicated in FIG. 3b, a pixel positioned at the top left corresponds to (1,1) address and a pixel positioned at the lower right corresponds to (512,512) address.

Hereinafter, procedures for finding the POI position in the monitor screen 11 based on the address (X,Y) of gravity center D, the address (Xl, Yl) of image pixel Dl and the address (Xr,Yr) of image pixel Dr obtained from the aforementioned procedures are described.

First of all, a distance d, between the left side pixel data Dl and the right side pixel data Dr, is expressed using the addresses Dl (Xl,Yl) and Dr (Xr, Yr) by the following equation (1):

$$d=((Xl-Xr)^2+(Yl-Yr)^2)^{1/2} \quad (1)$$

Figure 4:
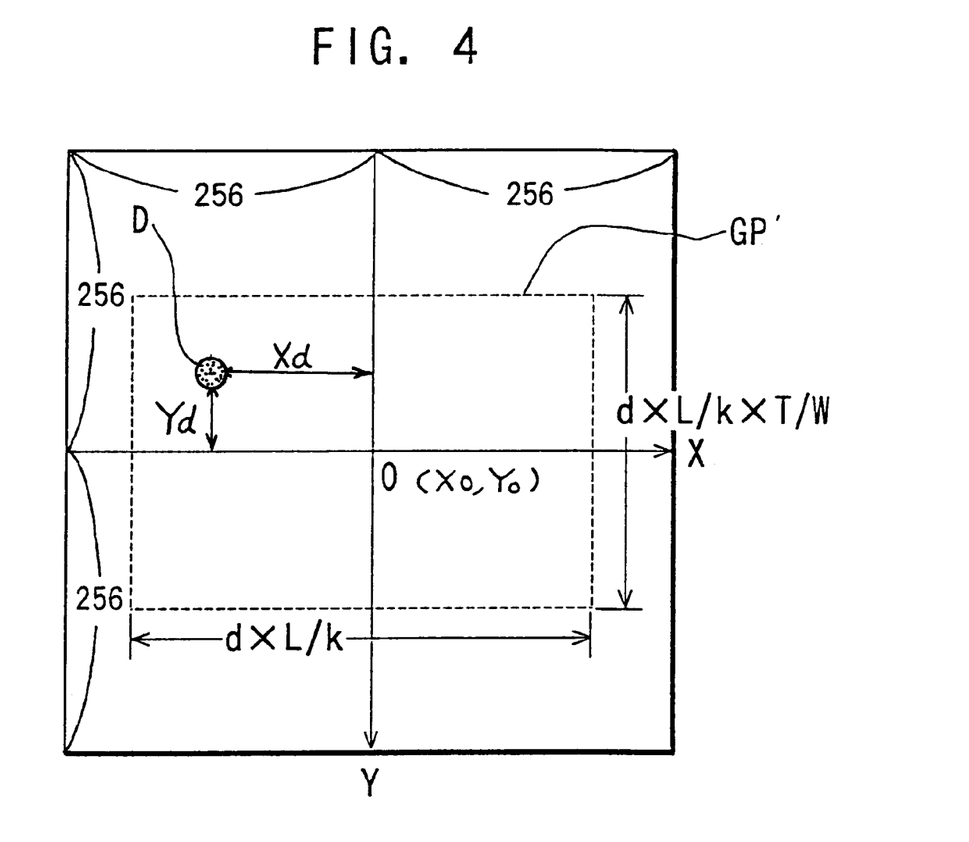
FIG. 4 is a diagram showing procedures as to detect a hit position by the mock gun.

Thereafter, the coordinate of aforementioned imaging area is converted into the one shown in FIG. 4 in a system having an origin O in the center thereof corresponding to the middle of the imaging area of the area sensor 24 and ruled by 512×512 squared pixels by the coordinate conversion portion 413 and an imaginary window GP' corresponding to the game image screen GP is established within the converted imaging area. As shown in FIG. 3a, the game image screen GP is similar to the monitor screen 11 thus the imaginary window GP' is set similar to the monitor screen 11 as well. Accordingly, the width dimension of the imaginary window GP' is set at d×(L/K) and the height dimension is set at d×(L/K)×(T/W). Where d is a distance between the pixel data Dl and the pixel data Dr, L is a width dimension of the game image screen GP, k is an actual distance between the infrared spot light points LSl & LSr, T is a height dimension of the monitor screen 11 and W is a horizontal dimension of the monitor screen 11. According to the above terms, the XY-coordinates of the gravity center D (Xd, Yd) are given by the following equations (2a & 2b):

$$Xd=256-X \quad (2a)$$

$$Yd=256-Y \quad (2b)$$

With these equations, an origin of the coordinate of the imaginary window GP' on the monitor screen 11, i.e., POI position (coordinates of point of impact: X0, Y0) is derived as:

$$X0=Xg+Xd(k/d) \quad (3a)$$

$$Y0=-Yg+Yd(k/d) \quad (3b)$$

Where Xg is a distance of a middle point (LSm) between LSl and LSr from an origin of the H-V coordinate along the H axis and Yg is a distance of the middle point (LSm) from the origin of the H-V coordinate along the V-axis (see FIG. 3A). Assuming the arrows of H-V axes indicate the plus direction.

Let us assume the case where the game image screen GP is projected 50 as to overlay the entire surface of the monitor screen 11, then we could approximately equate Xg to W/2. As a result, the first term of the right-hand sides of equations (3a & 3b) are canceled out, then we get:

$$X0=W/2+Xd(k/d) \quad (4a)$$

$$Y0=-Yg+Yd(k/d) \quad (4b)$$

Assuming the resolution of the monitor screen 11 in the vertical direction is R, then we equate Yg to R/2. As a result, the Y0 in equation 4b becomes as follows:

$$Y0=Yd(k/d)-R/2 \quad (5)$$

Furthermore, the distance D between the mock gun 20 and the monitor screen 11 is given by:

$$D=f(k/d) \quad (6)$$

where f is a focal point of the imaging lens arranged in front of the area sensor 24.

Figure 5:
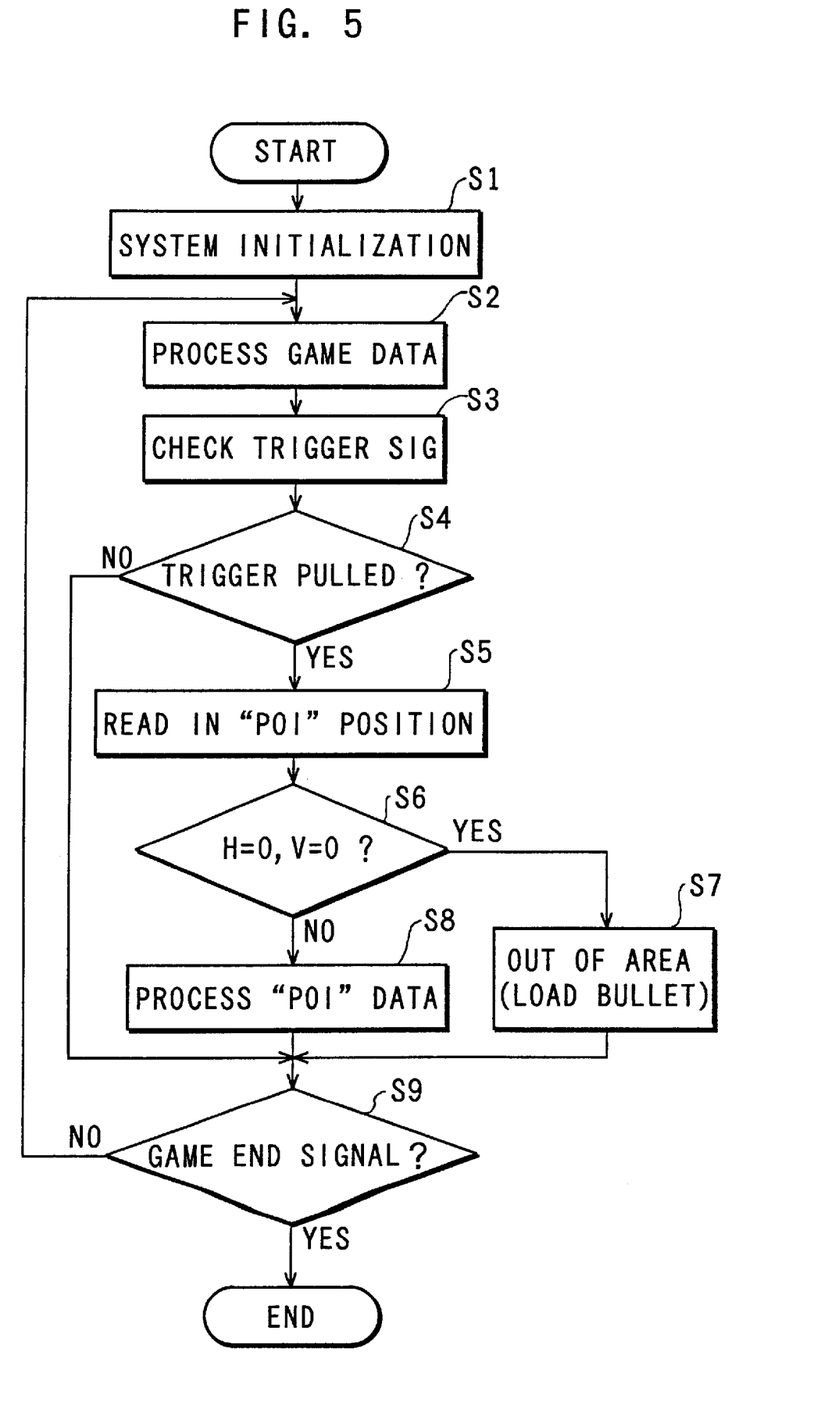
FIG. 5 is a flowchart that illustrates an operation of the shooting video game machine of FIG. 1.

Hereinafter the program operations of the game controller 13 are described with reference to the flowchart of FIG. 5.

First of all, the system as a whole is initialized (Step 1). Then game data processing is performed to create the game image (Step 2). The game data processing includes, for instance, polygon processing when the characters in the game screen are created with aid of polygons and this game processing is carried out at every field period (cycle) and at every field period an image signal is issued from the game controller 13 to the projector 12 to update the game image on the screen.

The trigger signal of the mock gun 20 is checked (Step 3) and a judgment is made to determine if the trigger signal is ON state (Step 4). When it is judged that the trigger signal is ON state, meaning that a player pulls the trigger 22 of the mock gun 20 (Yes in Step 4), the data regarding POI position (X0, Y0) detected by the position detection unit 16 is read in (Step 5). Subsequently, judgment is made to determine if the read-in data (X0, Y0) equals to (0, 0) data, i.e., the POI position is out of the game screen area (Step 6). Then if judged affirmative in step 6 (Yes in Step 6), an operation corresponding to the case where the POI is out of the game screen area will follow consequently. The aforementioned operation may be do-nothing or displaying "OUT"; however, in this embodiment a bullet charge (loading) operation is performed. If, however, judged negative in step 6 (NO in Step 6), an operation in accordance with the POI position is carried out (Step 8). The operation in this case includes counting of the bullets fired, determining if the virtual bullet hits the character, and counting the remaining bullets of the mock gun 20.

Then the game end is checked in accordance with the predetermined game rules (Step 9). When the game ending rules are met (Yes in Step 9), then the game program is ended. On the other hand, if the rules are not met (No in Step 9), then the program routine goes back the Step 2 to repeat the aforementioned steps. Note that when, in the Step 4, the trigger signal is found to be OFF state, i.e., a player is not pulling the trigger 22 of the mock gun 20, then the program routine directly goes to the Step 9 for game ending decision.

Figure 6:
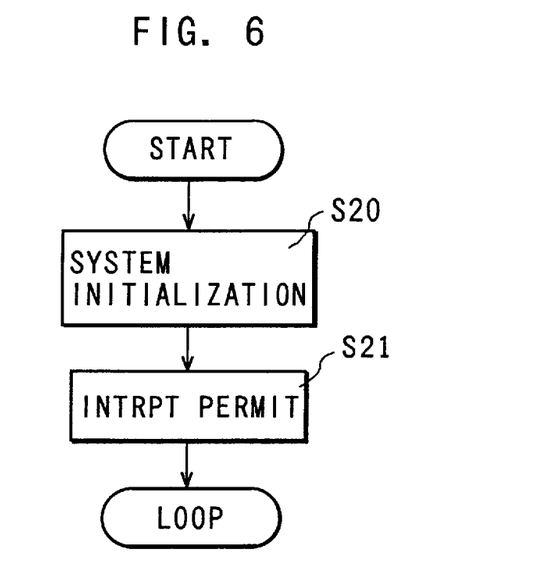
FIG. 6 is a flowchart that illustrates an operation of the position detection unit of the shooting video game machine of FIG. 1.

Next the program operations performed in the position detection unit 16 are described with reference to the flowchart shown in FIG. 6.

First of all, the system as a whole is initialized (Step 20), then the program issues an interruption permit so that the system is put to interruption standby state (Step 21). In this embodiment, two interruption routines (INTRPT I, INTRPT II) are given.

Figure 7:
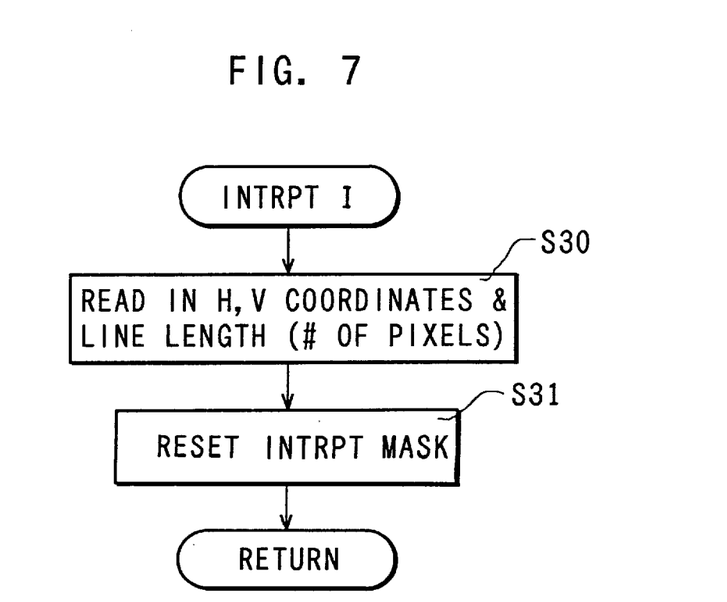
FIG. 7 is a flowchart illustrating an interrupting step of FIG. 6.

FIG. 7 is a flowchart describing the operation of an interruption routine of INTRPT I. This routine of INTRPT I begins upon issuance of an interruption signal at the time of data writing in the H-register 32 and the V-register 34. Then all the data (values) latched in the H-register 32, the V-register 33 and the L-register 34 are read-in the position detection CPU 41 (Step 30). Thereafter, the interruption mask is reset, then the system is put the interruption standby state (Step 31).

Figure 8:
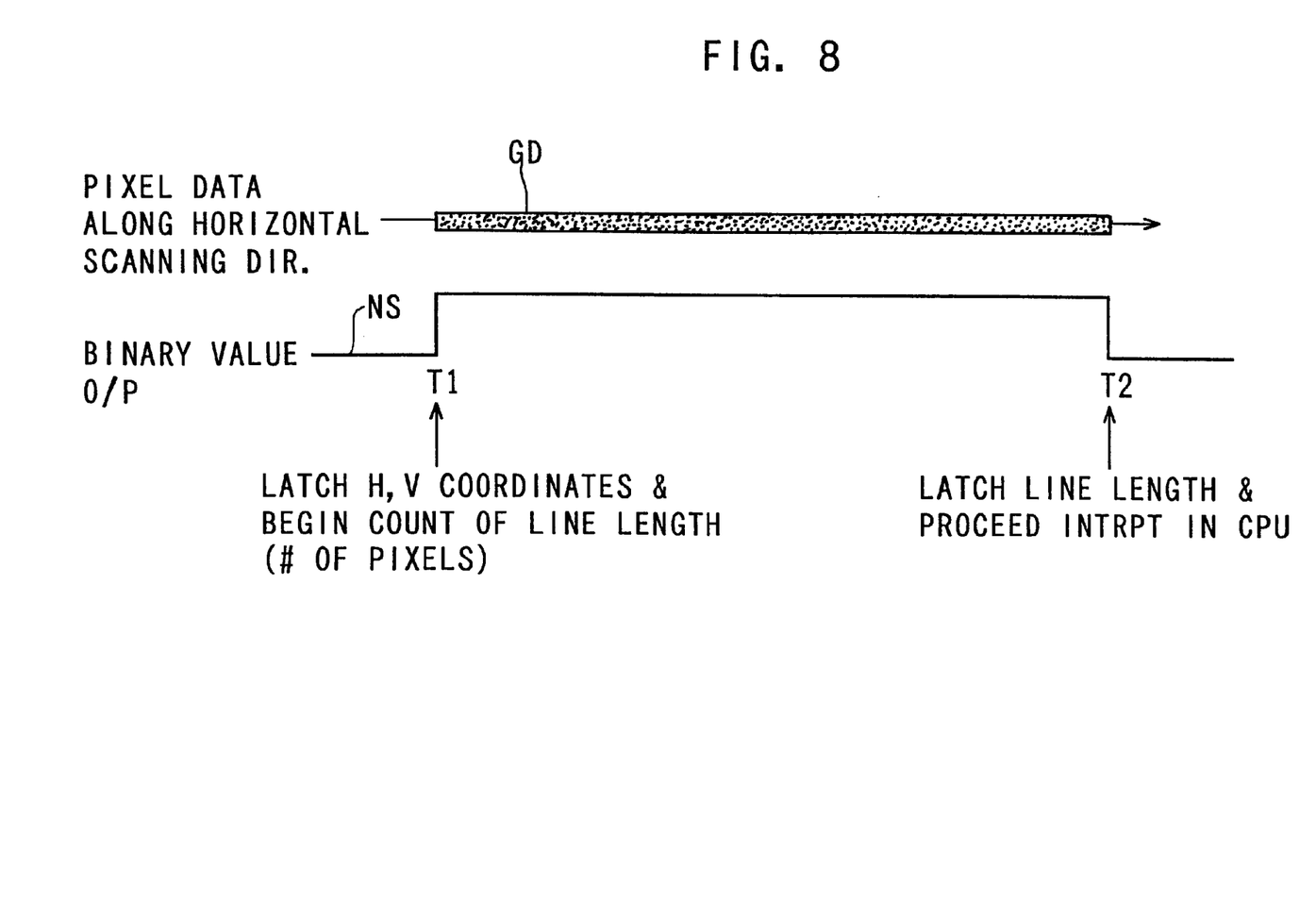
FIG. 8 is a flowchart illustrating an operation of an interrupting step shown in FIG. 7.

FIG. 8 is a diagram illustrating the operation of the INTRPT I. Designator GD indicates pixel image data outputted from the area sensor 24 and designator by NS indicates a binary output of the binary processing portion 31 during the horizontal scanning operation. As this FIG indicates, presence of the pixel image data GD corresponds to the high level output of the binary processing portion and the high level persists until the pixel image data GD is ceased. With the thus arranged INTRPT I, the XY coordinates of the pixel image at the rise time T1 of the high level output are latched and concurrently a count of the line length (counting the number of pixels) begins. Then the count continues until the time T2, i.e., a discontinuance point from high level output to low level output to obtain the line length (the total number of pixels forming the pixel data GD in FIG. 8). At the time T2, the line length is latched and concurrently the interruption routine to the position detection CPU 41 is carried out. In other words, the INTRPT I routine is carried out at every time the pixel image is present during the horizontal scanning operation.

Figure 9:
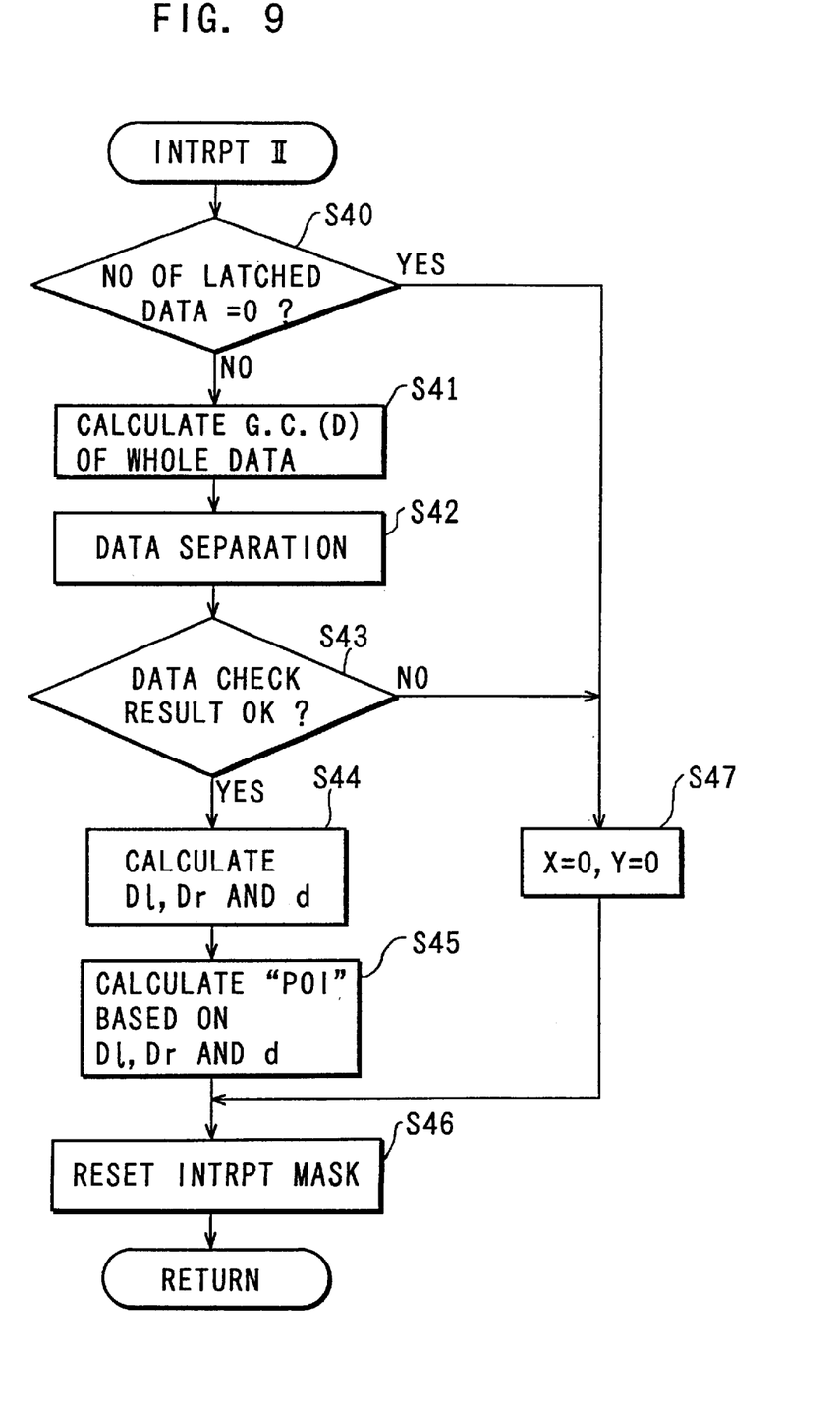
FIG. 9 is a flowchart illustrating another interrupting step of FIG. 6.

FIG. 9 is a flowchart describing the operation of the INTRPT II routine. The INTRPT II routine is initiated at time an interrupting signal which is generated at every time the vertical synchronized signal is outputted from the synchronization separator 35. First of all, the judgment is made to determine if the latched data exists in the position detection CPU 41 or not, i.e., the number of the latched data is 0 or not, (Step 40), if the judgment result is negative (No in Step 40), then the address data (Xd, Yd) for the gravity center D (FIG. 3) is calculated (Step 41) based on all the data stored in the position detection CPU 41 and the data are separated in two groups (left side data or right side data) in accordance with the calculated address of the gravity center D (Step 42).

Then the separated data are examined (Step 43) where the data examination at this step includes, for instance, a determination of adequacy of the number of data, separated in left and right with respect to the gravity center, for accurate calculation of the addresses of left and right pixels corresponding to the left and right infrared light spots, i.e., if the number is a certain number to adequately calculate the left and right pixel data Dl, Dr with high accuracy. If the judgment result is affirmative (Yes in Step 43), the addresses of the left and right pixel data Dl, Dr are calculated and the distance d is concurrently obtained (Step 44). Thereafter, with the obtained data (addresses of Dl, Dr and distance d), the coordinate of POI (X0, Y0) is obtained (Step 45). In the end, the interruption mask is reset, the system is put on interruption standby state (Step 46).

In case that the judgment result at Step 40 is affirmative or the judgment result at Step 43 is negative, the address of the gravity center (X0, Y0) is set at (0,0) (Step 47). The example of when the judgment result of the Step 40 is affirmative is the case such as when the POI position is out of the monitor screen area 11.

With the thus constructed and configured shooting video game machine of this invention, the image data read-out from the area sensor 24 are not stored in the so-called frame memory (that stores the whole pixel data read-out from the area sensor ); however, only the portion of read-out data which are needed to obtain the coordinate of POI are temporarily stored (latched) in the position detection unit. Accordingly, the position detection unit does not have to have a large memory capacity as in the case with the use of the frame memory, thus it allows the simpler structure of the position detection unit, rendering a lower cost of the position detection unit 16.

In the aforementioned embodiment, the line length of each group of pixels (high level data outputted from the binary processing portion 31) corresponding to either left or right infrared light spot is counted and all the high level data are summed up to find the address of the gravity center. Subsequently, all the latched data are divided into two groups with reference to the address (X0, Y0) of the gravity center. Then the group of data on the left side are summed up all together and averaged by division of the total number of left side data and similarly the group of data on the right side are summed up all together and averaged by division of the total number of the right side data to respectively obtain the addresses of left side infrared light spot (Xl, Yl) and right side infrared light spot (Xr, Yr).

The line length count in the above, however, is intended to function as a check procedure to see if the high level data outputted from the binary processing portion is an error caused by noise or other means of disturbance. Accordingly, the line length count can be performed for the verification purpose only (to determine if the data is/are not noise data) to avoid summation of erroneous high level data in address calculation. In such case, only the first address data in the pixel data row during the horizontal scanning operation is to be latched, and all of those group of first address data may be added up together and divided by the number of those group of first address data in address the calculation. It should be noted, however, in such a case the obtained address of the gravity center and other addresses are expected to be shifted leftward, thus some correction in the equations described above needs to be attended to. We, however, such correction is within the knowledge of those skilled in the art.

In the aforementioned embodiments, two light sources 14, 15 are used to emit the infrared spot lights; however, this invention is by no way limited to the number of light sources described in the above. In fact, the singular light source may be suffice to meet the object of this invention. In such case, it is acknowledged that some minor revision of the equations set forth above is needed. In addition, having three light sources or more may achieve the object of this invention as well.

Summing up all the aforementioned descriptions, the shooting video game machine of this invention comprises; a monitor screen for displaying a character; a light source arranged at a certain position relative to the monitor screen; a mock gun for aiming at the character on the monitor screen, the mock gun having an area sensor for capturing an image of a certain area including the light source therein in a unit of pixels; a light source position detection unit for repeatedly detecting an image capturing position of the light sensor within the image capturing area of the area sensor at a predetermined frame cycle; and a hit position detection unit for detecting a hit position of the mock gun in the monitor screen based on the image capturing position of the light source in the image capturing area. Wherein the light source position detection unit includes a light source address detector for detecting an address of a pixel data corresponding to the light source from a series of pixel data sequentially read out by the area sensor in synchronism with the certain frame cycle; a memory temporarily storing the address data detected by the light source address detector; and a light source position calculator for calculating the image capturing position of the light source with the use of the address data stored in the memory in a time period from a completion of the certain frame cycle to an end of the certain frame cycle.

Accordingly, with the thus constructed shooting video game machine, the whole data obtained at each completion of the horizontal scanning operation as in the case with the conventional video game machine are not stored in the frame memory. Instead only the portion of the data corresponding to the light source among the pixel data row obtained during the horizontal scanning operation are stored temporarily in the memory, thus it reduces the required memory capacity and in turn simplifies the structure of the light source position detection unit. As a result, it contributes to lowering the production cost of the shooting video game machine as a whole.

It is preferable that the shooting video game machine has a second light source. In this arrangement, the light source position detection unit may include an averaging unit for obtaining an address of a gravity center by dividing the summed up data obtained by summing up all the address data stored in the memory by the number of the address data and a finder unit which finds address data stored in the memory corresponding to each light source based on the address of the gravity center.

With this arrangement, first all the address data stored in the memory were summed up and averaged to obtain an address of a gravity center, subsequently, the address data corresponding to each light source are obtained based on the address of the gravity center. Accordingly, the POI position (hit position) can be accurately obtained.

In addition, a read-out of the pixel data is preferably performed in synchronism with a horizontal and a vertical scanning operations that define the frame cycle, the light source address detector detects an address data corresponding to the pixel data of the light source from the row of pixel data read out during each horizontal scanning operation and stores the address data corresponding to the light source in the memory and the memory outputs the stored address data to the light source position calculator at a time of each completion of the horizontal scanning.

With the above arrangement, the pixel data are read out from the area sensor in synchronism with the horizontal and vertical scanning that define a frame cycle and the pixel data corresponding to the light source among the pixel data row obtained during each horizontal scanning operation is/are extracted and stored in the memory. Then the memory outputs the pixel data stored therein to the light source position calculator at an end of completion of the horizontal scanning. Accordingly, the amount of the pixel data stored in the memory, at the end of each scanning operation with the above arrangement, is much less than all the pixel data obtained at each horizontal scanning operation as in the case of conventional game machine. Thus it enables a saving of memory capacity, rendering a cost savings for the memory.

Furthermore, the light source address detector may detect only an address data corresponding to a first pixel data of the light source in the row of pixel data read out during each horizontal scanning operation.

With the above arrangement, only the first address data of the pixel data corresponding to the light source obtained at each horizontal scanning operation is extracted and stored in the memory. In case of the shooting video game machine having a plurality of light sources, the first address data corresponding to each light source is extracted and stored in the memory. Thus the data stored in the memory at each scanning operation can be further lessened even compared with the case described above where the data corresponding to each light source is/are read-out and stored in the memory. As a result, less capacity is needed for the memory, thereby enabling a further cost reduction for the memory.

Yet furthermore ,the light source address detector preferably includes a count unit for counting the number of address data, and the light source position calculator calculates the image capturing position of the light source based on the address data corresponding to the first pixel data of the light source and the calculation result of the count unit when a plurality of pixel data corresponding to the light source in a series manner are found in the row of pixel data read out during each horizontal scanning operation.

With the above arrangement, the image position of the light source can be calculated based on the first address data of the plurality of pixel data corresponding to the light source and the number of address data (pixels) corresponding to the light source in the case that a plurality of pixel data in continuous form corresponding to the light source are obtained during the horizontal scanning operation.

Accordingly, only the first data of the plurality of pixel data corresponding to the light source and the length data (the number of address data-pixels) are stored in the memory to calculate the image position of the light source. Thus the memory capacity is minimized and results in lowering the cost of the memory.

Although the present invention has been fully described by way of examples with reference to the accompanying drawings, it is understood that various changes and modifications will be apparent to those skilled in the art. Therefore, unless otherwise such changes and modifications depart from the scope of this invention as defined in the following section, they should be constructed as being included therein.

What is claimed is:

1. A shooting video game machine wherein an object image is a target to be shot at, comprising:

a monitor screen for displaying the object image;

a light source arranged at a position having a predetermined positional relationship to the monitor screen;

a mock gun for aiming at the object image on the monitor screen, the mock gun having an area sensor having an array of pixels for capturing an image including an image of the light source;

a light source position detection unit for detecting an image position of the image of the light source within the array of pixels of the area sensor during a frame cycle;

the light source position detection unit including:

a light source image address detector for reading pixel data from the array of pixels and detecting address data of the pixel data corresponding to the image of the light source from a series of pixel data sequentially read from the array of pixels;

a memory for temporarily storing the address data detected by the light source image address detector;

writing means for writing to the memory only the address data detected of the pixel data corresponding to the image of the light source and not writing address data of pixel data not corresponding to the image of the light source; and a light source position calculator for calculating the image position of the image of the light source based on the address data stored in the memory; and a hit position detection unit for detecting a hit position of the mock gun on the monitor screen based on the image position of the light source in the array of pixels and the predetermined position relationship of the light source to the monitor screen.

2. The game machine according to claim 1, wherein:

the light source includes first and second light sources each arranged at a position having a predetermined positional relationship to the monitor screen;

the light source position calculator includes:
an averaging unit for obtaining an address of a gravity center as the image position of the image of the light source by averaging summed data obtained by summing up all the address data stored in the memory; and
a finder unit for finding the address data stored in the memory corresponding to each of the first and second light sources based on the address of the gravity center.

3. The game machine according to claim 1, wherein:

the reading of the pixel data is performed in synchronism with a horizontal scanning and a vertical scanning which define the frame cycle;

the light source image address detector detects the address data corresponding to the pixel data of the image of the light source from a row of pixel data read during each horizontal scan of the horizontal scanning;

the writing means stores the address data corresponding to the image of the light source in the memory for each horizontal scan; and the light source position calculator reads the address data from the memory at a time of each completion of the horizontal scanning.

4. The game machine according to claim 2, wherein:

the reading of the pixel data is performed in synchronism with a horizontal scanning and a vertical scanning which define the frame cycle;

the light source image address detector detects the address data corresponding to the pixel data of the image of the light source from a row of pixel data read during each horizontal scan of the horizontal scanning;

the writing means stores the address data corresponding to the image of the light source in the memory for each horizontal scan; and the light source position calculator reads the address data from the memory at a time of each completion of the horizontal scanning.

5. The game machine according to claim 3, wherein the light source image address detector detects only an address data of a first pixel data corresponding to the image of the light source in the row of pixel data read out during each horizontal scan.

6. The game machine according to claim 5, wherein:

the light source image address detector includes a counting unit for counting a number of the pixel data corresponding to the image of the light source; and the light source position calculator calculates the image position of the image of the light source based on the address data of the first pixel data corresponding to the image of the light source and a count result of the counting unit when a plurality of pixels in series in the row have pixel data corresponding to the image of the light source.

7. A shooting video game machine wherein an object image is a target to be shot at, comprising:

a monitor screen for displaying the object image;

a light source arranged at a position having a predetermined positional relationship to the monitor screen;

a mock gun for aiming at the object image on the monitor screen, the mock gun having an area sensor having an array of pixels for capturing an image including an image of the light source;

a light source position detection unit for detecting an image position of the image of the light source within the array of pixels of the area sensor during a frame cycle, the light source position detection unit including:
a memory for storing pixel addresses;
a light source image address detector for serially reading the array of pixels, determining ones of the pixels having data corresponding to the image of the light source based on a threshold during the serial reading, and storing addresses of the ones of the pixels in the memory based on having the data corresponding to the image of the light source; and
a light source position calculator for calculating the image position of the image of the light source based on the addresses stored in the memory; and a hit position detection unit for detecting a hit position of the mock gun on the monitor screen based on the image position of the light source in the array of pixels and the predetermined position relationship of the light source to the monitor screen.

8. The game machine according to claim 7, wherein:

the light source includes first and second light sources each arranged at a position having a predetermined positional relationship to the monitor screen; and the light source includes an averaging unit for obtaining an address of a gravity center as the position of the image of the light source by taking an average of the addresses stored in the memory.

9. The game machine according to claim 8, wherein the light source position calculator includes an identifying means for identifying the address data stored in the memory corresponding to each of the first and second light sources based on the address of the gravity center.

10. The game machine according to claim 7, wherein:

the light source image address detector serially reads rows of the array of pixels in successive horizontal scans during horizontal scanning of the frame to identify the pixels having data corresponding to the image of the light source and write address data of the pixels identified to the memory at a completion of reading each row; and the light source position calculator reads the address data from the memory at a time of each completion of the horizontal scanning.

11. The game machine according to claim 10, wherein the light source image address detector detects only an address data of a first pixel data corresponding to the image of the light source in the row of pixel data read out during each of said horizontal scans.

12. The game machine according to claim 11, wherein:

the light source image address detector includes a counting unit for counting a number of the pixel data corresponding to the image of the light source; and the light source position calculator calculates the image position of the image of the light source based on the address data of the first pixel data corresponding to the image of the light source and a count result of the counting unit when a plurality of pixels in series in the row have pixel data corresponding to the image of the light source.

\* \* \* \* \*